June 27, 1967  E. D. WALLACE  3,327,991
VALVE SEAT WITH RESILIENT SUPPORT MEMBER
Filed Jan. 7, 1965
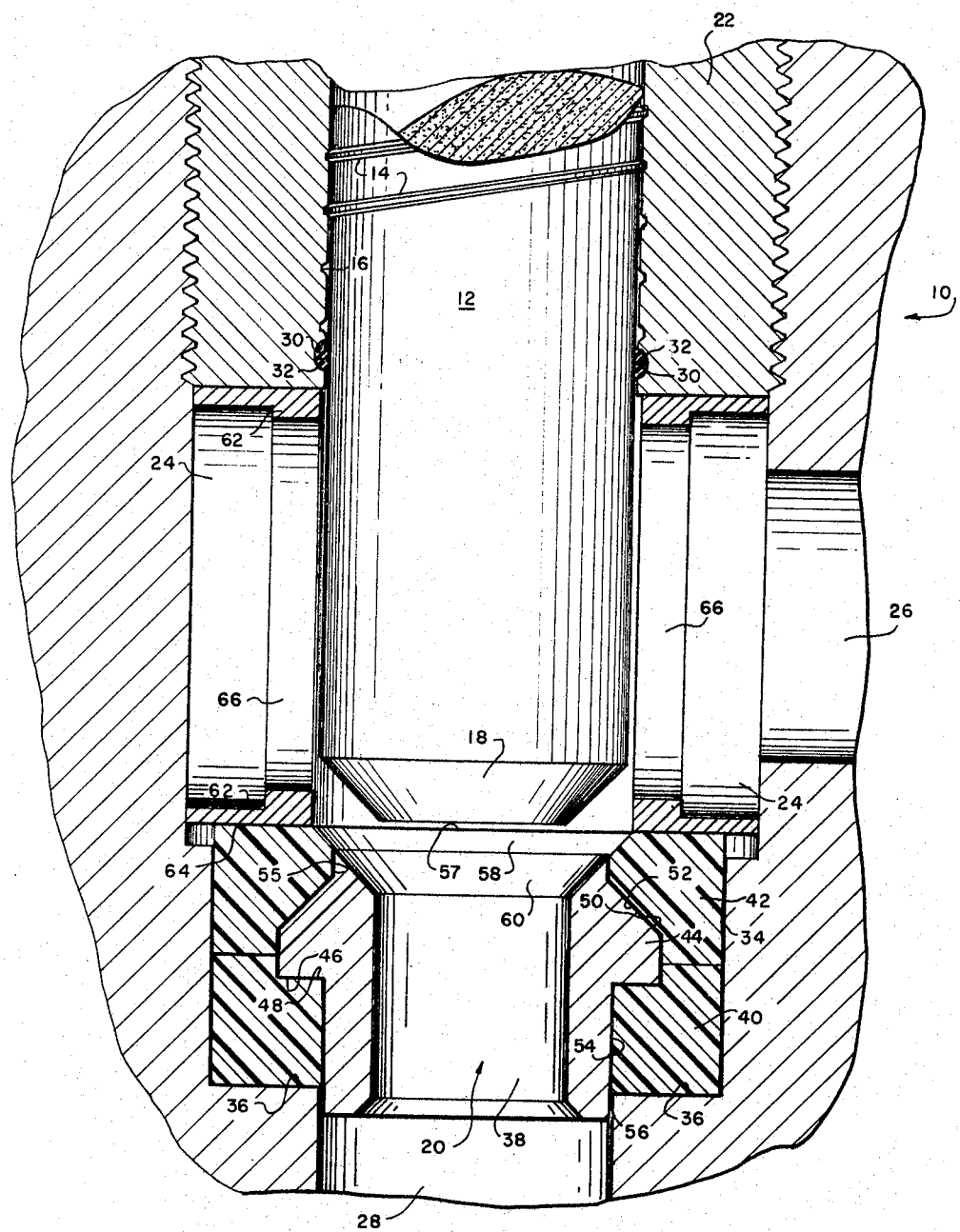
INVENTOR.
E.D. WALLACE
BY
George P Chandler
ATTORNEYS

United States Patent Office 3,327,991
Patented June 27, 1967

3,327,991
VALVE SEAT WITH RESILIENT SUPPORT MEMBER
Elvis D. Wallace, Huntsville, Ala., assignor to the United States of America as represented by the Administrator of the National Aeronautics and Space Administration
Filed Jan. 7, 1965, Ser. No. 424,153
3 Claims. (Cl. 251—172)

The invention described herein was made by an employee of the United States Government and may be manufactured and used by or for the Government of the United States of America for governmental purposes without the payment of any royalty thereon or therefor.

This invention relates to improvements in valve seating arrangements and more particularly relates to a seating arrangement which is especially useful in venting valves where high unit pressures are found.

Very high unit pressures are often encountered in the present day art of pneumatic and fluid valving. These high pressures present an especially critical problem in the launch support operations of rocket vehicles where various fluids under pressures from 3,000 to 10,000 pounds per square inch are common. Valves utilized in such an operation must be capable of withstanding erosion and damage during high flow velocity, particularly at metering positions, and at the same time must provide a very tight seal to prevent leakage while closed.

In order to meet the design criteria of high resistance to erosion and positive sealing, the valve poppet and the seat are generally constructed of hardened metal. A metal to metal poppet-seat arrangement depends wholly upon metal deformation for its sealing efficiency and consequently requires highly finished seating surfaces and high seating torque or force. Obviously a valve fabricated in this manner is often expensive and subject to wear and galling at the interface between the poppet and the valve seat due to the "metal deformation" effect produced during closing. Furthermore, a hardened valve seat is often subject to warpage and distortion which renders the seal with the poppet ineffectual and undependable where extremely low leak rates are desired.

Valve seats have been designed utilizing relatively soft materials such as artificial resins or rubber. These "soft seat" valves have often not proved satisfactory where high pressures are encountered due to the fact that the seat material is extruded from its mounting as the poppet is brought into contact with the seat and closing pressure applied. These relatively soft materials are also subject to excessive wear during periods of high flow velocities.

According to the present invention it has been found that the difficulties set forth above can be overcome by constructing a valve seat partly of a body of relatively soft material combined with an insert ring of a hard, wear resistant material. The body of soft material is fabricated from two separate and distinct rings fitted closely into a recess in the body of the valve. One ring acts as a resilient spring member supporting the hard insert and a sealing ring. The latter ring and the insert have faces machined thereon to form a sealing abutment surface upon which the poppet can be seated.

The materials from which the relatively soft rings are fabricated may be identical or they may vary in hardness and wear characteristics. It is important that the supporting ring be resilient enough to yield to pressure exerted by the poppet but to resist an excessive displacement of the insert and the sealing ring. The hardness of the seal ring will vary with the system pressure since at higher pressures the ring must be relatively hard to resist wear from the high flow velocities present in such a system and to resist extrusion under the higher forces which are inherent in high pressure sealing loads. It is axiomatic that the material of both soft rings must be inert to the fluid the flow of which is to be controlled.

At the inlet, the resilient ring is open a small extent to and subjected to the system pressure existing at that point. The fluid pressure is thus transmitted through the resilient ring to the face of the sealing abutment establishing a pressure assisted seal with the poppet.

The insert ring of hard material lines the apertures through the soft rings with the exception of the sealing abutment. Almost complete enclosure of the body of relatively soft material is therefore accomplished since, as described above, the other exterior surfaces are fitted into the recess formed at the inlet. The only portion of the rings not completely confined are the sealing abutment and that part of the resilient ring open to fluid pressure at the inlet.

In operation the poppet descends to the valve closed position contacting the soft seat portion and the hard insert along the sealing abutment surface. The unit pressure of the soft seat abutment on the poppet face is then equal to the flow pressure of the system as explained above. A further slight lowering force applied to the poppet pushes the insert and the soft rings downwardly placing the body of soft material in compression thus raising the unit pressure across the soft seat abutment to a value higher than the system pressure assuring a positive leak-tight seal. No extrusion of the soft material can take place since only a very small area of the resilient member remains exposed and that is subject to the inlet pressure. The hard insert ring protects the valve seat from erosion and damage during high flow velocity at all positions of the poppet from fully opened to fully closed.

Accordingly it is an object of this invention to provide a valve having high resistance to fluid flow erosion.

Another object of this invention is to provide a valve having a positive leak proof seal in an environment of high pressures.

Yet another object of the invention is to provide a valve seat a portion of which is constructed of relatively soft compressible material.

Still another object of this invention is to provide a valve seat having a relatively soft resilient portion and a relatively hard durable portion.

Another object of this invention is to provide a valve seat having a relatively hard, durable insert and a relatively soft resilient portion which is so completely enclosed by the valve elements that it will not be extruded when subjected to compressive forces.

These and other objects and advantages of this invention will be more apparent on reference to the following specification, appended claims, and drawing wherein:

The figure is a partly sectioned side elevation of a valve constructed in accordance with the instant invention.

In order to better understand the construction and use of this novel valve seat it will be described in relation to an on-off valve which is to be utilized in a pressurized fluid supply system. It is to be understood, however, that various other uses may be found for this novel device. For example, such a valve could be used in piston type pumps such as slush pumps, cementing pumps, acidizing pumps, water pumps, etc. Other uses will be readily apparent to those skilled in the art.

With continued reference to the figure, reference numeral 10 designates generally the body of an on-off valve containing a poppet 12 which when rotated is caused to move upwardly or downwardly due to the interaction between the threads 14 and 16. At its lowermost end the poppet 12 is formed into a tapered angular face 18 machined to fit within the valve seat designated generally by the reference numeral 20. The poppet 12 extends upwardly through a threaded nut 22 and terminates in mechanism (not shown) for imparting a rotational motion thereto.

The body 10 of the valve is bored to form a chamber 24 one side of which is partly closed by the nut 22. The poppet valve 12 and an O-ring 30 seated within a recess 32 in the nut 22 complete the closing of that side of chamber 24. An outlet port 26 extends through one side of the chamber 24 while on another side of the chamber is an inlet port 28.

The inlet port 28 is enlarged at the point of juncture with the chamber 24 to form a recess 34 into which the valve seat 20 is closely fitted. A shoulder 36 is formed at the bottom of the recess 34 connecting the outer wall of the recess to the outer wall of the inlet port.

In the preferred manner of fabrication, the valve seat 20 consists of three distinct elements. These elements are an annular insert ring 38 constructed of a rigid material such as hardened or stainless steel, a resilient ring 40 and a seal ring 42. The rings 40 and 42 are fabricated from relatively soft metallic materials such as Teflon, copper, aluminum, Kel–F or nylon molded or machined into the desired shape. As described heretofore, the rings 40 and 42 may be fabricated from identical materials or materials having differing hardness or resilience characteristics. The limiting factors are sufficient resilience in ring 40 to yieldably support the sealing ring 42 and the insert 38 and sufficient resistance to flow and pressure extrusion and wear in ring 42 at the working pressures which exist at inlet 28. Both rings are closely fitted within a recess 34 at the mouth of the inlet 28 with the ring 42 resting upon the ring 40. With this construction, the resilient ring 40 and seal ring 42 obviously act as a supporting means for restricting movement of the insert 38 in all directions, especially in the direction in which the fluid flows through the inlet of the valve.

The insert 38 includes an outwardly extending flange 44 having a flat bottom portion 46 resting on a shoulder 48 cut from the resilient ring 40. The flange 44 tapers upwardly into the body of the insert 38 as shown at 50 and rests within a similarly tapered indentation 52 cut from the body of the seal ring 42.

Both rings 40 and 42 include apertures 54 and 55 respectively extending through their centers. The diameter of the apertures 54 and 55 are approximately equal to the outside diameter of the insert 38 such that they fit closely and tightly about it. The diameters of the apertures 54 and 55 are, however, slightly less than the diameter of the inlet port 28 so that a small annular portion 56 of the resilient ring 40 overhangs and is exposed to the fluid pressures existing at that point. The exposed portion must be maintained at a relatively low percentage of the total bottom area of the resilient ring 40. For example, a clearance of .005 inch between the insert 38 and side of the inlet 28 provides sufficient exposure of the resilient ring 40 to accomplish the intended purpose which is described hereinafter.

The upper end of the ring 42 and the insert 38 are tapered to correspond to the inclination of the face 18 formed on the lower end of the poppet 12. Thus, inwardly tapered annular sealing abutments 58 and 60 are formed on the ring 42 and the insert 38 respectively. As the poppet 12 is lowered toward the valve seat 20 the flow of fluid is reduced until finally stopped when the poppet face 18 engages the sealing abutments 58 and 60.

A flanged hold down ring 62 is sized to fit within the chamber 24 and extend from the bottom of the nut 22 to the upper surface 64 of the sealing ring 42. This ring 62 contains a plurality of apertures 66 to allow a free flow of fluid within the chamber 24.

Thus, it is seen that the sealing ring 42 and the resilient ring 40 are completely enclosed by valve elements with the exception of the face 58 and the annular portion 56.

When the poppet 12 is lowered to the closed position, the only non-enclosed part of the rings 40 and 42 is the annular portion 56 and perhaps a small tolerance gap between the poppet 12 and the ring 62 forming a second annular portion 57 at the uppermost edge of the abutment face 58. Pressure applied across the abutment face 58 will, therefore, result in compression of rings 40 and 42 rather than shear as would occur in devices heretofore utilized since there is little or no tendency for extrusion through the annuli 56 and 57.

The seat herein described functions in the following manner. As the poppet 12 descends to the valve closed position initial contact is made between the poppet face 18 and the sealing abutments 58 and 60. At this point in the closing sequence the unit pressure across the face 58 is equal to the pressure at the inlet 28 side of the valve since the flow pressure is applied to the rings 40 and 42 through the annular portion 56. A further slight lowering of the poppet 12 will force the insert 38 and sealing ring 42 downward reducing the confinement volume available for the rings 40 and 42 and thus place them in compression raising the unit pressure across the face 58 to a value higher than the inlet pressure. Such a pressure differential assures a positive and leak tight seal between the poppet face 18 and the surfaces 58 and 60.

It will be apparent that by utilizing the teachings of this invention a valve seat having vastly superior features to those presently known can be produced. The valve can achieve high local sealing forces over a small local area without a consequent high closing torque or force and with a minimum of shear and extrusion of the sealing rings. At the same time the valve seat is protected from susceptibility to high flow rate erosion and damage. Furthermore, the valve seat is not tolerance sensitive in that it does not depend on metal to metal contact for sealing and can thus be fabricated from a variety of materials in a relatively inexpensive manner.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefor intended to be embraced therein.

What is claimed and desired to be secured by United States Letters Patent is:

1. A valve for controlling flow of fluid having an inlet and an outlet comprising:
   (a) a valve element mounted for movement toward and away from said inlet to control flow therethrough;
   (b) an enlarged annular recess at the mouth of, and concentric with said inlet and contiguous to said valve element;
   (c) a valve seat member closely fitted in said recess and including
      (1) a first ring of soft, resilient material concentric with said recess and having an aperture diameter slightly less than the diameter of said inlet whereby a portion of said ring is exposed to the fluid pressure at said inlet,
      (2) a second ring of soft, resilient material concentric with said recess, contiguous with said valve element and having a portion forming an abutting surface for said element, and
      (3) said first ring being fabricated from material which is harder than said second ring; and
   (d) a valve seat ring member of relatively hard, wear resistant material concentric with said annular recess supported by and lining the interior of said first and second rings excepting the portion of said first soft ring exposed to the fluid pressure at the inlet and the portion of said second soft ring forming an abutting surface for said element whereby the unit fluid pressure at the inlet will be transmitted to said abutting surface in order that an increase in force exerted by said valve element on said abutting surface will compress said first and second rings and produce a positive fluid tight seal.

2. A high pressure shut-off valve for controlling flow of fluid having an inlet and an outlet comprising:
   (a) a valve element mounted for movement toward and away from said inlet to control flow therethrough;
   (b) a valve seat at said inlet adapted to receive said valve element including
      (1) an insert means having a portion forming an abutting surface for said valve element, and
      (2) a resilient means supporting, engaging and being shaped to interfit with said insert means so as to restrict movement thereof in all directions,
      (3) said resilient means being of such size that a portion thereof normally overhangs said inlet to expose said portion to the fluid pressure, thereby when said valve element is moved into engagement with said valve seat, the force exerted on said portion as the result of an increase in the unit fluid pressure at said inlet will be transmitted to said abutting surface to produce a positive fluid tight seal.

3. A high pressure shut-off valve for controlling flow of fluid having an inlet and an outlet comprising:
   (a) a valve element mounted for movement toward and away from said inlet to control flow therethrough;
   (b) an enlarged annular recess at the mouth of, and concentric with said inlet and contiguous to said valve element;
   (c) a pair of rings of soft, resilient material disposed in said recess;
   (d) an insert means having a portion forming a first abutting surface for said valve element; and
   (e) a flange on said insert means engaged with and supported by said pair of rings and being shaped to interfit therewith so as to restrict movement of said insert means in all directions;
   (f) one of said pair of rings having a portion forming a second abutting surface for said valve element;
   (g) the other of said pair of rings being of such size that a portion thereof normally overhangs said inlet to expose said portion to the fluid pressure, thereby when said valve element is moved into engagement with said first abutting surface, the force exerted on said portion as the result of an increase in the unit fluid pressure at said inlet will be transmitted to said first abutting surface to produce a positive fluid tight seal.

References Cited

UNITED STATES PATENTS 2,060,748   11/1936   Roberts et al. _____ 251—332

M. CARY NELSON, *Primary Examiner.*

ARNOLD ROSENTHAL, *Examiner.*

W. J. JOHNSON, *Assistant Examiner.*